(12) United States Patent
Cheung et al.

(10) Patent No.: US 8,014,753 B2
(45) Date of Patent: Sep. 6, 2011

(54) DISTRIBUTED BASE STATION TEST BUS ARCHITECTURE IN A WIRELESS NETWORK

(75) Inventors: Ken L. Cheung, Livingston, NJ (US); Chen-Huan Chiang, Princeton Junction, NJ (US); Kenneth Y. Ho, Ledgewood, NJ (US); John A. Andersen, Oakland, NJ (US); Bradford G. Van Treuren, Lambertville, NJ (US); Robert W. Barr, Yardley, PA (US); Victor J. Velasco, Princeton, NJ (US); Dante De Rogatis, West Caldwell, NJ (US)

(73) Assignee: Alcatel Lucent, Paris (FR)

( * ) Notice: Subject to any disclaimer, the term of this patent is extended or adjusted under 35 U.S.C. 154(b) by 2151 days.

(21) Appl. No.: 10/893,216

(22) Filed: Jul. 19, 2004

(65) Prior Publication Data

US 2006/0013146 A1    Jan. 19, 2006

(51) Int. Cl.
*H04M 11/00* (2006.01)
(52) U.S. Cl. ......... 455/406; 455/561; 370/328; 370/254
(58) Field of Classification Search .................. 455/561; 370/328, 254
See application file for complete search history.

(56) References Cited

U.S. PATENT DOCUMENTS

| | | | | |
|---|---|---|---|---|
| 4,339,633 | A * | 7/1982 | Ahmed | 370/363 |
| 6,667,972 | B1 * | 12/2003 | Foltan et al. | 370/354 |
| 6,750,687 | B1 * | 6/2004 | Klecka, III | 327/153 |
| 2005/0076125 | A1 * | 4/2005 | Weber et al. | 709/227 |
| 2005/0113024 | A1 * | 5/2005 | Capece et al. | 455/41.2 |
| 2005/0125575 | A1 * | 6/2005 | Alappat et al. | 710/41 |
| 2006/0248426 | A1 * | 11/2006 | Miner et al. | 714/741 |
| 2007/0089003 | A1 * | 4/2007 | Whetsel | 714/726 |

OTHER PUBLICATIONS

R.W. Barr, C.-H. Chiang, and E.L. Wallace, "End-to-End Testing for Boards and Systems Using Boundary Scan," Proceedings IEEE International Test Conference, pp. 585-592, 2000.
H. Braunisch and R. Nair, "On the Techniques of Clock Extraction and Oversampling," Proceedings IEEE Symposium on High Performance Interconnects, pp. 139-143, 2001.
497AE and 1215E Boundary-Scan Master 2 User Manual, 1998, Agere Systems.
F.P. Higgins and R. Srinivasan, "BSM2: The Next Generation Boundary-Scan Master," Proceedings IEEE VLSI Test Symposium, pp. 67-72, 2000.
IEEE Standard Test Access Port and Boundary-Scan Architecture, IEEE Std 1149.1-2001.
IEEE Standard Boundary-Scan Testing of Advanced Digital Networks, IEEE Std 1149.6-2003.
T.I. Inc., SN74ABT8996, Addressable Scan Ports, Multidrop-addressable IEEE STD 1149.1 TAP Transceivers, Aug. 1994. TI Web Site, SCBS489.
B. Van Treuren and J.M. Miranda, "Embedded Boundary Scan," IEEE Design and Test of Computer, pp. 20-25, Mar. 2003.
L. Whetsel, "A Proposed Method of Accessing 1149.1 in a Backplane Environment," Proceedings IEEE International Test Conference, pp. 206-216, 1992.

* cited by examiner

*Primary Examiner* — Nimesh Patel
(74) *Attorney, Agent, or Firm* — Wall & Tong, LLP

(57) ABSTRACT

A distributed test architecture of transmitting boundary scan Test Access Port (TAP_signals over a serial channel is disclosed. The architecture facilitates the system testing and remote field update of distributed base stations in a wireless network. The distributed test architecture enables system testing as if the distributed units are on a backplane within the same chassis by creating a plurality of logical connections between the distributed unit and the test bus using a single bit fiber line and a five bit TAP test bus.

19 Claims, 3 Drawing Sheets

DISTRIBUTED BASE STATION TEST BUS ARCHITECTURE IN A WIRELESS NETWORK

CROSS REFERENCES

This application is concurrently filed and co-pending with United States non-provisional application titled "Slow-Fast Programming of Distributed Base Stations in a Wireless Network" Ser. No. 10/893,215 which is incorporated herein by reference.

BACKGROUND

As shown in FIG. 1, a traditional base station 100 usually consists of controller boards 101, channel cards 102, clocking units 103 and radio cards 104, which all reside on a system backplane in the same chassis which includes a test bus 120 and a system bus 130. The system level test bus architecture is an extended Boundary Scan (BS) multi-drop bus architecture. It is made of the five BS TAP signals and contains a boundary scan master (BSM) 121 as a test bus master in the controller board 101. The controller board (card) 101 also includes a microprocessor 122. Each of the other boards contains an addressable scan port (ASP) device 115 as a test bus slave. This multi-drop test architecture supports embedded boundary scan, where the BS tests are embedded on the controller board 101 and executed by the microprocessor 122 as a part of system functions during field operation.

A Distributed Base Station (DBS) 200 is shown in FIG. 2, the Base Band Unit (BBU) 250 consists of controller boards 201, channel cards 202, clocking units 203 and fiber interface units (FIU) 206, as well as other types of cards not shown for reasons of clarity, on one local backplane which includes a test bus 220 and a system bus 230. A single-bit fiber 260 connects the BBU 250 with a radio frequency unit (RFU) 270 which consists of a radio card 204 and a fiber interface adapter (FIA) 207. The FIA 207 acts as a remote and distributed backplane for the radio card 204 in RFU 270. Furthermore, communication between BBU 250 and RFU 270 is accomplished by the communication of FIU 206 and FIA 207 via the long single-bit fiber cable 260. The FIU 206 and FIA 207 also include a serializer and de-serializer (SerDes) 209a, 209b which serialize and deserialize the data to and from, respectively, the single bit fiber cable 260. Over sampling and multiplexing design techniques must also be implemented due to the limited bandwidth between the pair SerDes 209a and 209b as shown in FIG. 2.

The DBS's unique distributed design enables mobile operators to deploy the RFUs 270, the components of a base station that send and receive radio signals, and power system separately from the BBUs 250, the components of a base station that process and send the radio signals to and from a mobile switching center (not shown). The RFUs 270 and BBUs 250 can be connected by a customer-provided single-mode fiber cable 260 at distances of 12 km or even higher. These single mode fiber cables can also include other types of tethers commonly used as backhaul, such metallic wire lines.

For example, in an urban environment, multiple BBUs 250 can be deployed at a company maintenance facility and connected to a mobile switching center via a T1 line, while the RFUs 270 are deployed miles away near major highways, train and bus stations and hospitals and are connected to the BBUs 250 via the single-mode fiber cable 260.

The DBS provides a compact, low cost unit for small or entry-level networks. It is designed for suburban build-out, hole filling, hot spots, in-building or any broad coverage, medium capacity network need. Flexible mounting options include poles, walls, roofs and various configurations in buildings.

A DBS is designed for increased capacity and coverage in the smallest footprint. Its compact construction reduces space requirements and real estate costs, which may significantly shorten the time to market through rapid site selection and zoning. In addition, the overall quality of network service improves via the ability of the DBS to provide coverage for a variety of environments. Furthermore, the DBS can use remote software control for remote maintenance, which results in fewer on-site visits and trimmed travel and labor costs.

The current disclosure presents a third-generation (3G) CDMA2000 base station that, because of its compact design and distributed architecture, offers the flexibility needed to meet a variety of deployment needs and coverage challenges for mobile operators.

However, the DBS poses great challenges for system testing and field update operation due to its distributed architecture since only a serial channel exists between the local and remote backplanes. More importantly, the serial channel is a functional channel, rather than a dedicated test channel such as the five BS TAP signals which connect the cards to the test bus 220.

One challenge is that the FIA 207 of the DBS is not only a distributed backplane for a radio card 204 but also the FIA 207 is a board in the distributed system. The problem arises how to effectively test the FIA 207 and the radio card 204 during system integration test and field operation.

The long fiber 260 causes significant propagation delay, which limits BS test clock (TCK) frequency. Usually a single-mode fiber incurs a 5 µs propagation delay per kilometer. For example, a 10 km long fiber (i.e., 20 km roundtrip) incurs a 100 µs roundtrip delay. Since BS test data output (TDO) changes only on the falling edge of TCK and BS test data input (TDI) is clocked on the rising edge of TCK, for a 50% duty cycle TCK there is only 0.5 cycles for a falling edge to travel to the FIA 207 and for data returning to FIU 206 (i.e., 0.5 cycle=100 µs). Hence, for this example, TCK must be slower than 5 kHz for proper operations. Additionally, due to the slow TCK frequency to accommodate long fiber delay, effectively updating the configuration PROMs of distributed units as previously discussed can be a challenge. Therefore, it becomes essential to slow down TCK for distributed system testing which has the disadvantage of increasing test and programming duration.

Another problem associated with the DBS is how to perform field update without on-site visits for the distributed RFUs 270. The design of the remote units must be robust enough so that a failure during remote field update does not cause the breakdown of the remote units and thus reduction of its reliability.

In order to obviate the deficiencies of the prior art and to address the above challenges, it is an object of the disclosure to present a novel distributed BS test bus architecture for transmitting BS TAP signals over a serial channel to facilitate distributed system testing and remote field update of a DBS, thereby enabling the system testing as if the distributed units are on a backplane within the same chassis.

These objects and other advantages of the disclosed subject matter will be readily apparent to one skilled in the art to which the disclosure pertains from a perusal or the claims, the appended drawings, and the following detailed description of the preferred embodiments.

DETAILED DESCRIPTION

This disclosure presents a novel distributed boundary scan (BS) test bus architecture of transmitting IEEE 1149.1 Boundary Scan (a.k.a JTAG) Test Access Port (TAP) signals over a serial channel to facilitate distributed system testing and remote field update of a DBS. The disclosed BS test bus architecture enables the system testing as if the distributed units are on a backplane within the same chassis.

Figure 1:
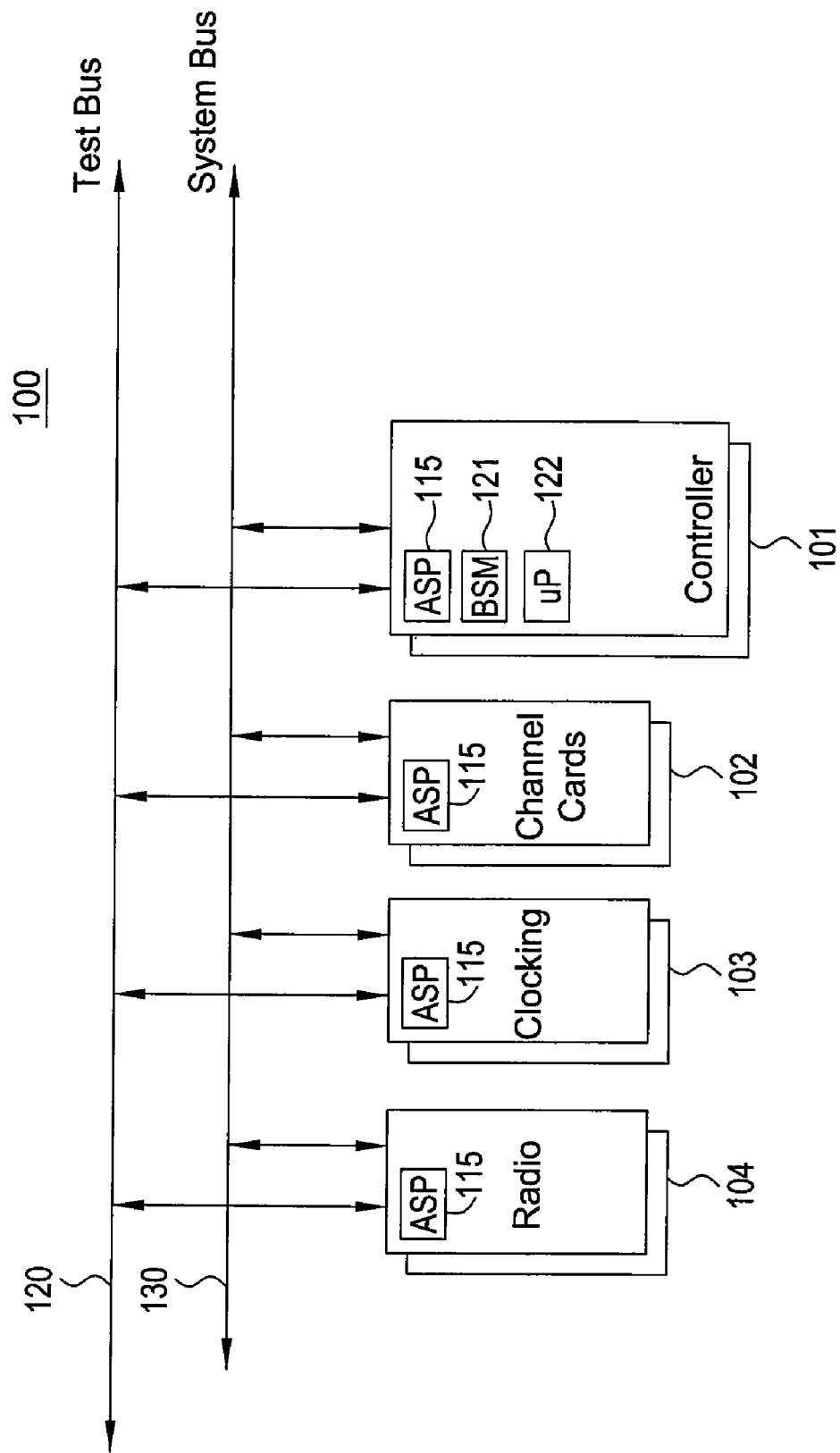
FIG. 1 is a representation of a traditional prior art Base Station.
Figure 2:
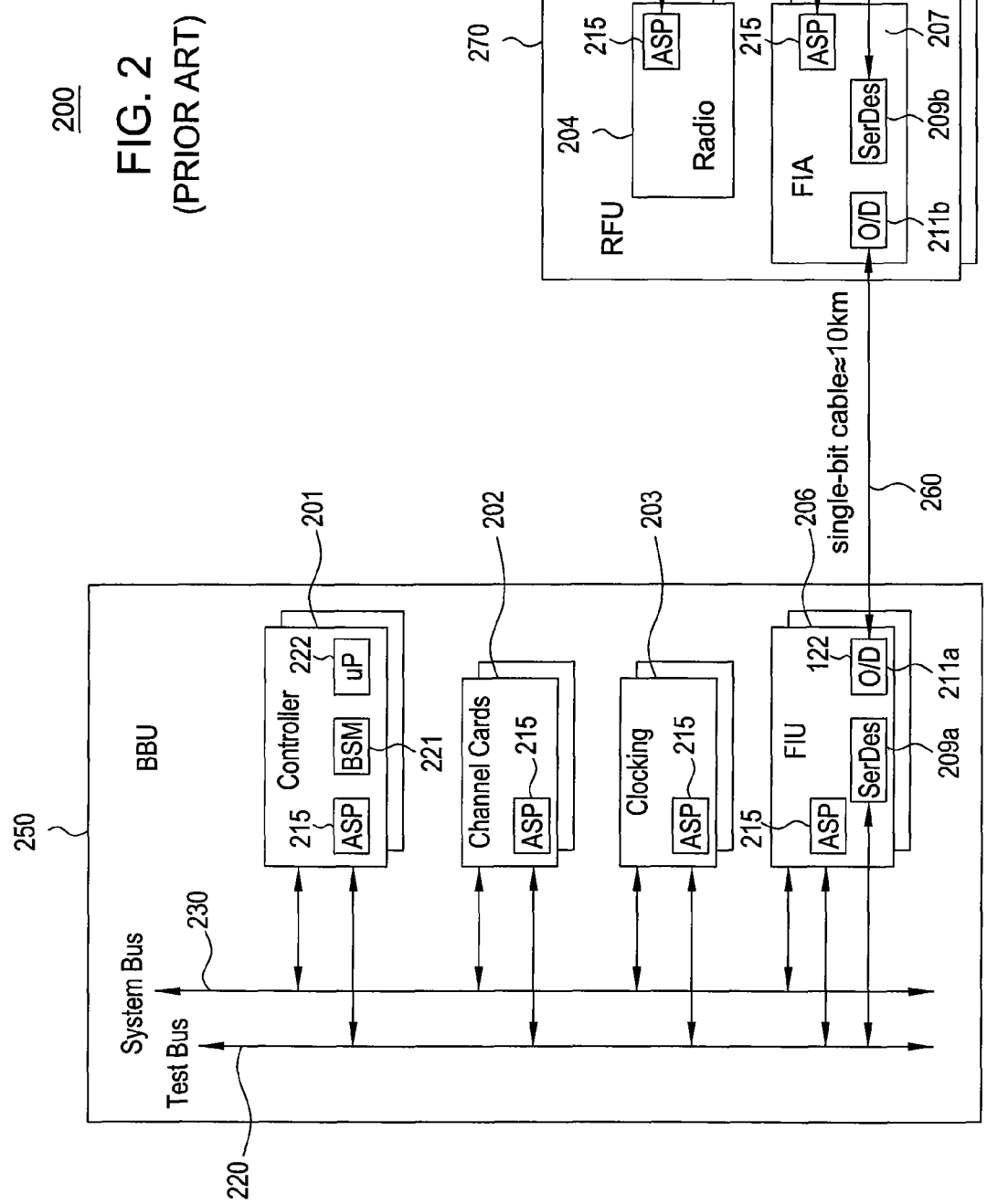
FIG. 2 is a representation of a Distributed Base Station.
Figure 3:
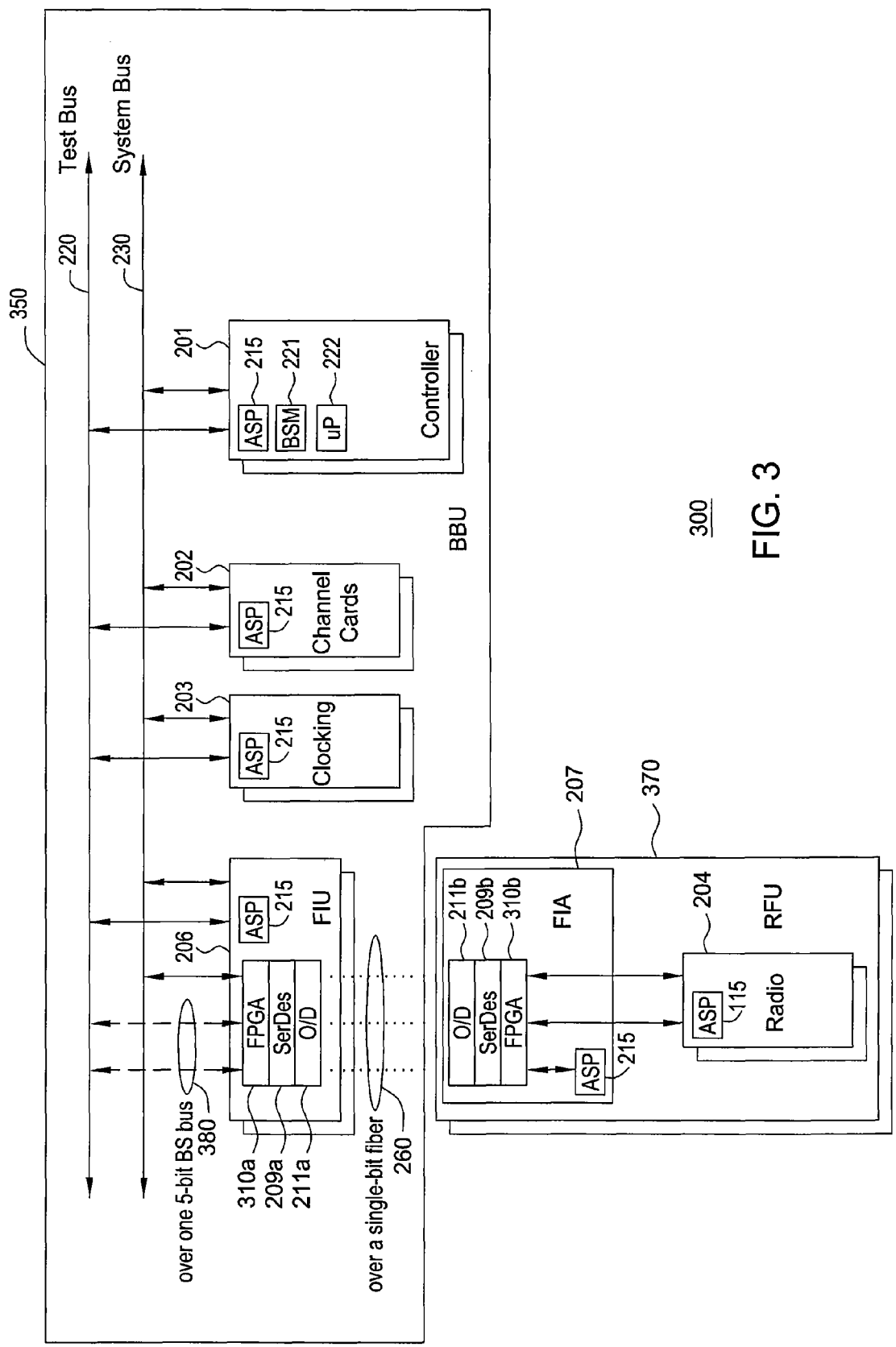
FIG. 3 is a representation of a Distributed Base Station for implementing Boundary Scan according to an embodiment of the present subject matter.

An embodiment of a DBS 300 is shown in FIG. 3. The DBS 300 is similar to the DBS 200 of FIG. 2; therefore, like elements have been given like reference numerals to facilitate an understanding of the present invention. The BBU 350 consists of controller boards 201, channel cards 202, clocking units 203 and FIUs 206 on one local backplane which includes a test bus 220 and a system bus 230. The single-bit fiber 260 connects the BBU 350 with a RFU 370 which has a radio card 204 and a FIA 207. The DBS 300 of FIG. 3 also includes a 5 bit BS bus 380 which provides a pair of virtual test bus connections. Both the FIA 207 and the FIU 206 contain a field programmable gate array (FPGA) 310a and 310b, a SerDes 209a and 209b and an optical/digital transceiver 211a and 211b. While an optical/digital transceiver is shown, it is not meant to limit the application of the disclosed subject matter; other types of transmission cable, which require other types of interfaces/decoders/converters are equally envisioned. The FPGA 310a and 310b implement overlapping and multiplexing compression techniques that are applied to the 5 tap signals as well as the data on the system bus to be transmitted between the pair of SerDes 209a and 209b via the single-bit fiber channel 260.

This disclosed distributed test archittcture enabes the distributed system testing as if the distributed FIAs 207 and radio cards 204 are on backplane within the chassis.

The FIA 207 is equipped with an ASP 215 device to ease the test and field update, although FIA 207 itself is a distributed backplane for radio cards. The FIA 207 is also treated as a board in the distributed test bus architecture as shown in FIG. 3.

Other aspects of distributed field testing (DFT) in the current application are also addressed in the disclosed architecture.

According to ASP protocols, each board in the system must be assigned to a unique 10 (ten) bit address, unique addresses other than 10 bit addresses are also equally envisioned. In traditional system test bus architecture, the 10-bit ASP address is assigned as a combination of a board ID and a slot ID, where the board ID is unique for each type of boards (e.g. channel cards, clocking cards, controller cards etc.) and the slot ID is unique for each slot in the system backplane. In the proposed distributed test bus architecture, the ASP address is assigned as the combination of board and slot IDs. However, the slot ID of FIA 207 and the radio card 204 in any of the RFUs 270 is identical to that of the corresponding FIU 206. That is, the FIA 207 and radio card 204 are treated as if they are plugged into the same slot of corresponding FIU 206 as shown in the distributed test architecture in FIG. 3. This slot ID is embedded in the data that is transmitted over the fiber 260 from FIU 206 to FIA 207.

In the multi-drop test bus architecture, only the primary TDO (PTDO) of the ASP with a matched 10-bit address of the ASP protocol is enabled to drive the test bus while the others are in high impedance. In the disclosed architecture, there are two logical links (i.e. virtual connections) over one 5-bit BS bus 380 that is connected to the multi-drop test bus 220 without the administration of an ASP device as shown in FIG. 3. Again, the 5-bit BS bus is for illustration only and other multi-bit BS buses are also envisioned. As a result, an ASP protocol watcher (not shown) is implemented to guarantee the proper TDO enabling in a multi-drop bus. The ASP watcher consists of at least a TAP controller and a simplified ASP protocol decoder. The ASP protocol watcher may be implemented in the fiber interface FPGA 310a or 310b of either the FIU 206 or FIA 207 to monitor the ASP protocol sent from BSM 221 to all ASPs 215. The PTDO is enabled when the ASP address matches either FIA 207 or the radio card 204 (only need to check the board ID since the slot ID for the corresponding FIU 206, FIA 207 and radio card 204 are identical) on the same slot. Otherwise, the PTDO remains (or changes to) disabled when an address is not matched.

As readily evident from FIG. 3, the disclosed test bus that connects the local system backplane with the distributed backplane is built over a functional channel. One consequence is that without the existence of a working clocking unit in BBU 250, the DBS is designed to shut off the serial fiber channel 260 as a fail-safe mechanism, which can preclude performing system test and field maintenance using the test bus as well. This defeats the purpose of having a test bus. Therefore, the FPGA 310a of the FIU 206 generates the clock for the fiber channel in the absence of a working clock unit 203 in the DBS.

Standards in wireless networking are advancing faster than the designs. Hence, system designs maximize use of programmable devices such as FPGAs, whose program contents are usually stored in configuration PROMs. Therefore, in-system field update for configuration PROMs of communication systems becomes an important issue. It is especially essential and costly for a DBS given the numbers of distributed RFUs 270 that need updating and are separated in long distances.

To minimize cost and to ease the field update for the DBS, the disclosed distributed test bus architecture and embedded boundary scan can be used advantageously to perform remote in-system field updates. That is, via the embedded software control and the distributed test bus architecture, configuration PROMs in each of the RFUs 270 can be accessed and updated remotely from a computer that is connected to a network (e.g. the internet) where the BBU 250 is connected.

However, to prevent an accidental breakdown of the DBS due to a failure during in-system remote update, it is advised to have at least a secondary configuration PROM for the FPGAs 310a and 310b as a backup. This is essential for the FIA 207, since once the fiber channel breaks down, there is no other way of remote accessing distributed RFUs 270 other than on-site visits.

All the embedded BS software features, such as BS integrity test, system test and remote field update, can be implemented as a part of system software functions for remote software control of the DBS. These are used for system integration test and for system maintenance during field operation.

In the disclosed test bus architecture, the special ASP address assignment not only guarantees the uniqueness of the resulting ASP address, but also provides a consistent logical view of related FIUs, FIAs and radio cards. The ASP protocol watcher implemented in the fiber interface FPGA of the FIU ensures the integrity of multi-drop test bus.

While preferred embodiments of the present inventive system and method have been described, it is to be understood that the embodiments described are illustrative only and that the scope of the embodiments of the present inventive system and method is to be defined solely by the appended claims when accorded a full range of equivalence, many variations and modifications naturally occurring to those of skill in the art from a perusal hereof.

What we claim is:

1. A distributed base station comprising:
a baseband unit comprising one or more fiber interface units, clocking cards, channel cards, and controller cards, wherein the said fiber interface units, clocking cards and channel cards are communicatively coupled to a test bus and system bus; and
a radio frequency unit remotely located from and communicatively coupled to the baseband unit comprising a radio card and a fiber interface adaptor;
wherein each of the one or more fiber interface units, clocking cards, channel cards, controller cards, fiber interface adaptor, and radio card is addressed by an identifier comprising the combination of a slot code and a board-type code, and the one or more fiber interface units, fiber interface adaptor and the radio card have the same slot code.

2. The distributed base station of claim 1, wherein the baseband unit is communicatively coupled to the radio frequency unit via one or more single bit fibers connected between the one or more fiber interface units and the fiber interface adaptor.

3. The distributed base station of claim 2, wherein the one or more fiber interface units comprise a clock functioning independently from clocking signals occurring from the clocking cards in the distributed base station.

4. The distributed base station of claim 1, wherein each of the one or more fiber interface units, clocking cards, channel cards, controller cards, fiber interface adaptor, and radio card comprise an addressable scan port.

5. The distributed base station of claim 4, wherein the one or more fiber interface units, clocking cards, channel cards, and controller cards are communicatively coupled to a test bus through the addressable scan port.

6. The distributed base station of claim 4, wherein the fiber interface unit further comprises a field programmable gate array, a serializer and de-serializer, and an optical/digital transceiver.

7. The distributed base station of claim 6, wherein the field programmable gate array is further communicatively coupled to the test bus through virtual connections not passing through the addressable scan port.

8. The distributed base station of claim 7, wherein the virtual connections comprises a plurality of logical links over one or more multi-bit buses.

9. The distributed base station of claim 8, wherein the field programmable gate array is configured as a multiplexer.

10. The distributed base station of claim 7, wherein the virtual connections comprise two logical links over one 5-bit boundary scan bus.

11. The distributed base station of claim 7, wherein the field programmable gate array is configured as an addressable scan port protocol watcher.

12. The distributed base station of claim 2, wherein the fiber interface adaptor further comprises a field programmable gate array, a serializer and de-serializer, and an optical/digital transceiver.

13. The distributed base station of claim 12, wherein the field programmable gate array is configured as an addressable scan port protocol watcher.

14. The apparatus of claim 1, wherein the test bus comprises a distributed boundary scan architecture, configured to propagate IEEE 1149.1 boundary scan test access port signals.

15. The apparatus of claim 1, wherein the test bus is configured to facilitate distributed system testing and remote field updating of the distributed base station.

16. The distributed base station of claim 1, wherein the controller cards include a boundary scan master and a microprocessor.

17. A method of communicating with a distributed base station, comprising addressing the distributed base station through a test bus, wherein the distributed base station comprises a baseband unit and a remotely located radio frequency unit, and the baseband unit and remotely located radio frequency unit are configured such that they appear to the test bus as to reside on a back plane within the same chassis.

18. The method of claim 17, wherein the test bus comprises a distributed boundary scan architecture, configured to propagate IEEE 1149.1 boundary scan test access port signals.

19. The method of claim 17, wherein the test bus is configured to facilitate distributed system testing and remote field updating of the distributed base station.

* * * * *